United States Patent [19]
Corten

[11] Patent Number: 6,065,334
[45] Date of Patent: May 23, 2000

[54] DEVICE FOR RENDERING VISIBLE THE FLUID FLOW OVER A SURFACE

[75] Inventor: Gustave Paul Corten, Alkmaar, Netherlands

[73] Assignee: Stichting Energieonderzoek Centrum Nederland, Petten, Netherlands

[21] Appl. No.: 09/180,858

[22] PCT Filed: May 16, 1997

[86] PCT No.: PCT/NL97/00276

§ 371 Date: Jan. 26, 1999

§ 102(e) Date: Jan. 26, 1999

[87] PCT Pub. No.: WO97/44674

PCT Pub. Date: Nov. 27, 1997

[30] Foreign Application Priority Data

May 17, 1996 [NL] Netherlands .......................... 1003153

[51] Int. Cl.$^7$ .............................. A63B 53/00; G01P 13/00; G01W 1/00
[52] U.S. Cl. ........................................................ 73/170.02
[58] Field of Search ........................... 73/170.01, 170.02, 73/170.05, 170.06

[56] References Cited

U.S. PATENT DOCUMENTS 4,567,760  2/1986  Crowder .
4,730,488  3/1988  David ........................................ 73/189

FOREIGN PATENT DOCUMENTS 702 289  1/1954  United Kingdom .

OTHER PUBLICATIONS

U. Herzke et al., "Visualisation of the Stagnation Point: First Results of a New Method", 7 pages, TU Delft, Institute for Wind Energy, Aug. 1994.

*Primary Examiner*—William Oen
*Attorney, Agent, or Firm*—Young & Thompson

[57] ABSTRACT

In order to determine the flow status of a surface moving through the fluid, it is proposed to mount flaps on that surface. Such flaps hinge from the one to the other position depending on the flow conditions. The position of such flaps can be rendered particularly readily visible if the one side of the flap has an appearance which differs from that of the other side of the flap and/or if the surface which is covered by the flap has an appearance in the one end position which differs from the appearance of the surface which is covered by the flap in the other end position. A different appearance can, for example, be realized by providing a differently colored, reflective or retroreflective surface or existing differences in transmission, fluorescence or phosphorescence or even coverage of an illuminated surface.

22 Claims, 3 Drawing Sheets

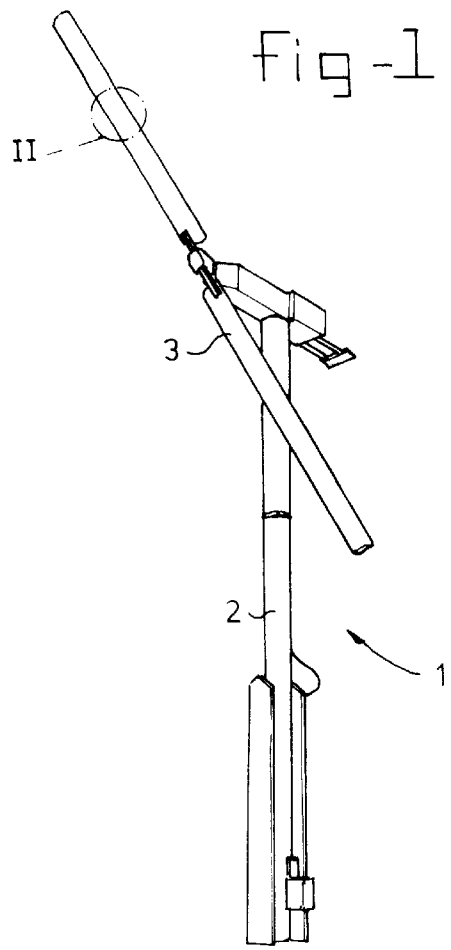
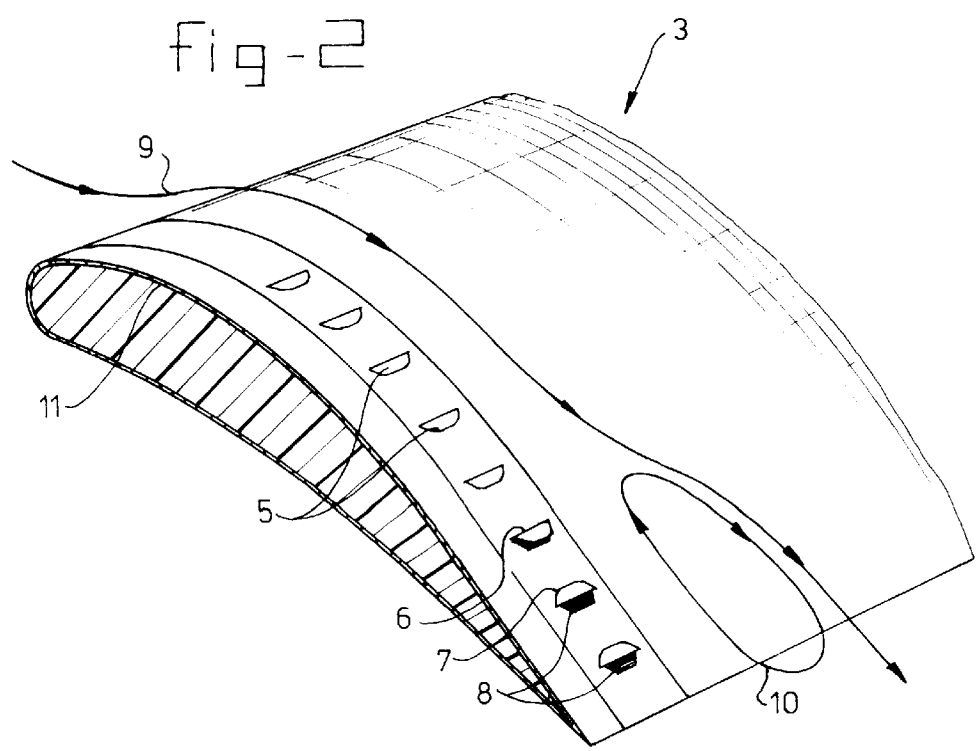

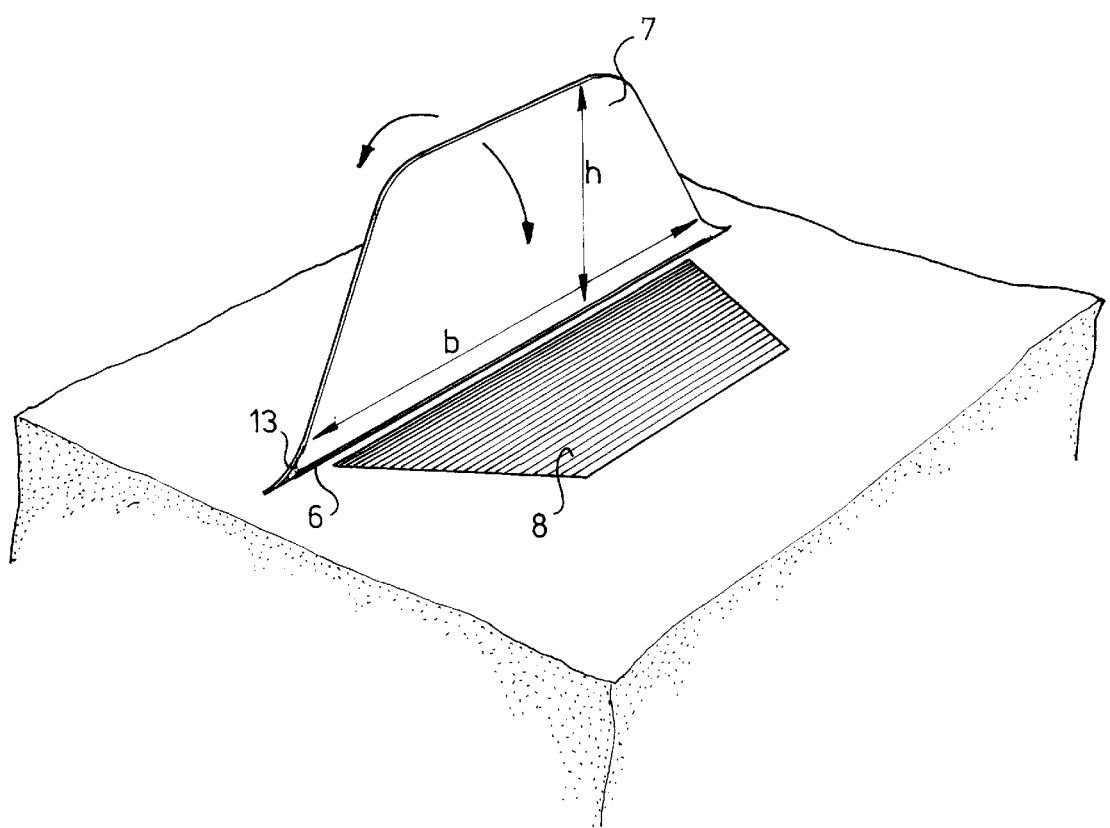

DEVICE FOR RENDERING VISIBLE THE FLUID FLOW OVER A SURFACE

The present invention relates to an device according to the preamble of claim 1.

A device of this type is disclosed in report IW-94079-R of August 1994 by the Institute for Wind Energy, the Technical University of Delft, entitled: 'Visualisation of the Stagnation Point: First Results of a new Method'.

In this report it is proposed to fit one or more flaps, each having a width of approximately 1 metre, at the front, that is to say the zone close to the stagnation line (that is to say the stagnation point where flow ceases), of a wing-like surface. Such flap or flaps is/are fitted at an angle with respect to the so-called stagnation line and is/are of a width such that the stagnation line remains between the ends of each flap for all positions to be expected and certain conclusions relating to the flow are drawn from the shift in the turn-over point along the flap surface.

A construction of this type replaces constructions known in the prior art consisting of a number of preferably woollen threads, or jetting smoke or the like in the vicinity of the surface. Such a change has been made in particular because, especially when woollen threads are used on relatively large surfaces, the visibility of the position of the threads constitutes a problem.

If, for example, it is desired to obtain a general impression of the flow distribution in the case of wind turbines, it is not uncommon to take photographs thereof from a distance of 75 metres away from the vanes thereof. Small woollen threads are not visible on these photographs. Visibility remains poor even if use is made of technically sophisticated aids, such as stroboscopes. Large threads are influenced to a greater extent by the centrifugal force and give more flow disruption. Under certain flow conditions, the threads make rapid fluttering movements. As a consequence of this, blurring due to movement can become so severe that the position of the threads becomes invisible.

For these reasons electrical devices for rendering the flow direction visible by electrical means have been proposed in the prior art. However, these devices require vulnerable electrical connections for the power supply or signals. Moreover, these can affect the flow. An appreciable installation space in the object to be studied is also required. Consequently a long preparation time is necessary and the construction of the object can be weakened and a method of this type cannot be used in all locations.

This still takes no account of problems such as lightning strikes. Finally, woollen threads tend to be influenced by centrifugal force, that is to say to move outward.

The flap according to the abovementioned report solves these problems due to the effect of centrifugal force and the electrically complex construction.

However, visibility remains a problem at greater distances. After all, with a flap height of, for example, 5 mm it will be not be simple to detect (partial) turning over from a distance of a few tens of metres. The position at which the flap points towards the observer is visualised and, as a result, this position is dependent on the direction from which the observer views the flaps. This gives rise to systematic errors. The flap surface is stretched relatively severely close to the turn-over point for each flap. This is a disadvantage because permanent deformation can occur and because rapid response of the flap to a different flow condition is hindered by the hysteresis of the flap material. Moreover, the region close to the turn-over point is virtually perpendicular to the profile and, as a result, can easily give rise to flow disruption.

This problem is exacerbated when stalling is found. After all, the transition from one state to another then takes place gradually over a larger region.

The aim of the present invention is to avoid this disadvantage and to provide an improved device for detecting and rendering visible the fluid over a surface.

This aim is achieved with a device as described above having the characterising features of claim 1 or 2.

'Optically covered' is always understood as that condition which deviates essentially from the condition in which the relevant surface of said object is not covered. That is to say, even if the flap relating to the part of the surface does not completely cover but is (a few) tens of degrees removed therefrom, in certain circumstances there can still be said to be optical covering. Optical is understood not only as visible light but also as infrared or ultraviolet radiation and even other electromagnetic wave phenomena.

The invention is based on the insight that a different appearance is produced after the flap flips over. This can be caused because the flap itself is provided with different optical characteristics on the two sides, because the flap has optical characteristics which differ from those of the surface or because the part covered by the flap in a rest position has optical characteristics which differ from the rest of the surface. In all cases there will be a very clear visible change in appearance when the flap turns over. That is to say, different optical characteristics are produced in different positions of the flap with respect to the surface.

This change in appearance can be a difference in colour. However, it is also possible that the reflective characteristics change because one or more of the surfaces is retroreflective.

It is also possible to improve visibility by using fluorescence or phosphorescence. These and other possibilities for improvement are generally known to those skilled in the art.

In addition to the abovementioned possibilities, techniques such as polarisation, refraction and diffraction will occur to those skilled in the art.

The construction according to the Technical University of Delft report described above has the disadvantage that the flap has to be more or less elastic over the entire height thereof in order to be able to achieve the turning over. Consequently, the requirements in respect of the materials used are particularly stringent. The height of the flaps used in the said construction is at most 5 mm, as a result of which the visibility and sensitivity are limited.

The difference in appearance becomes particularly clear if the different sides of the flaps have a different colour. Another possibility is to provide that region of the surface for which the flow characteristics have to be determined, and on which the flap lies in the first position, with an appearance which differs from that of the region on which the flap lies in the second position.

In order to avoid this disadvantage, it is proposed according to the invention to fit a number of smaller flaps on the surface. Such flaps can then move independently of one another and, thus, the prevailing flow conditions can be accurately determined in any position. In contrast to the construction described above, the surface of the flap is always oriented in the same direction and no torsion takes place over the width of the flap. Moreover, the position of change can be accurately localised. This is in contrast to methods in which smoke is used.

Although the width of the flaps can have any value known in the prior art, preference is given, however, to making said flaps 1–20 cm and more particularly 8 cm wide. Using the same arguments, this gives 0.1–4 cm and more particularly approximately 2.5 cm for the height. On the one hand the width is such that a substantial portion of the flow is covered and, on the other hand, a surface of 8 cm×2.5 cm is readily visible from a relatively large distance with the aid of the measures described above.

The flaps can have any shape known in the prior art. Preferably, however, the flaps are of trapezium-shaped construction, the corners of the free ends of the trapezium being rounded. In addition, the join to the blades etc. is also rounded. It has been found that it is possible to obtain an appreciably longer life by means of, in particular, this latter rounding.

The flap can be joined to the surface by any method known from the prior art. Preferably, the flap consists of a relatively rigid body section and a relatively flexible hinge section. The hinge section can, for example, be a film hinge, in which case a rubber sheet material is used.

The invention will be explained in more detail below, inter alia with reference to an illustrative embodiment shown in the drawings. In the drawings:

FIG. 1 shows, diagrammatically, a wind turbine;

FIG. 2 shows part of the vane profile of the wind turbine;

FIG. 3 shows a detail of a flap shown in FIG. 2 and

Figure 4:
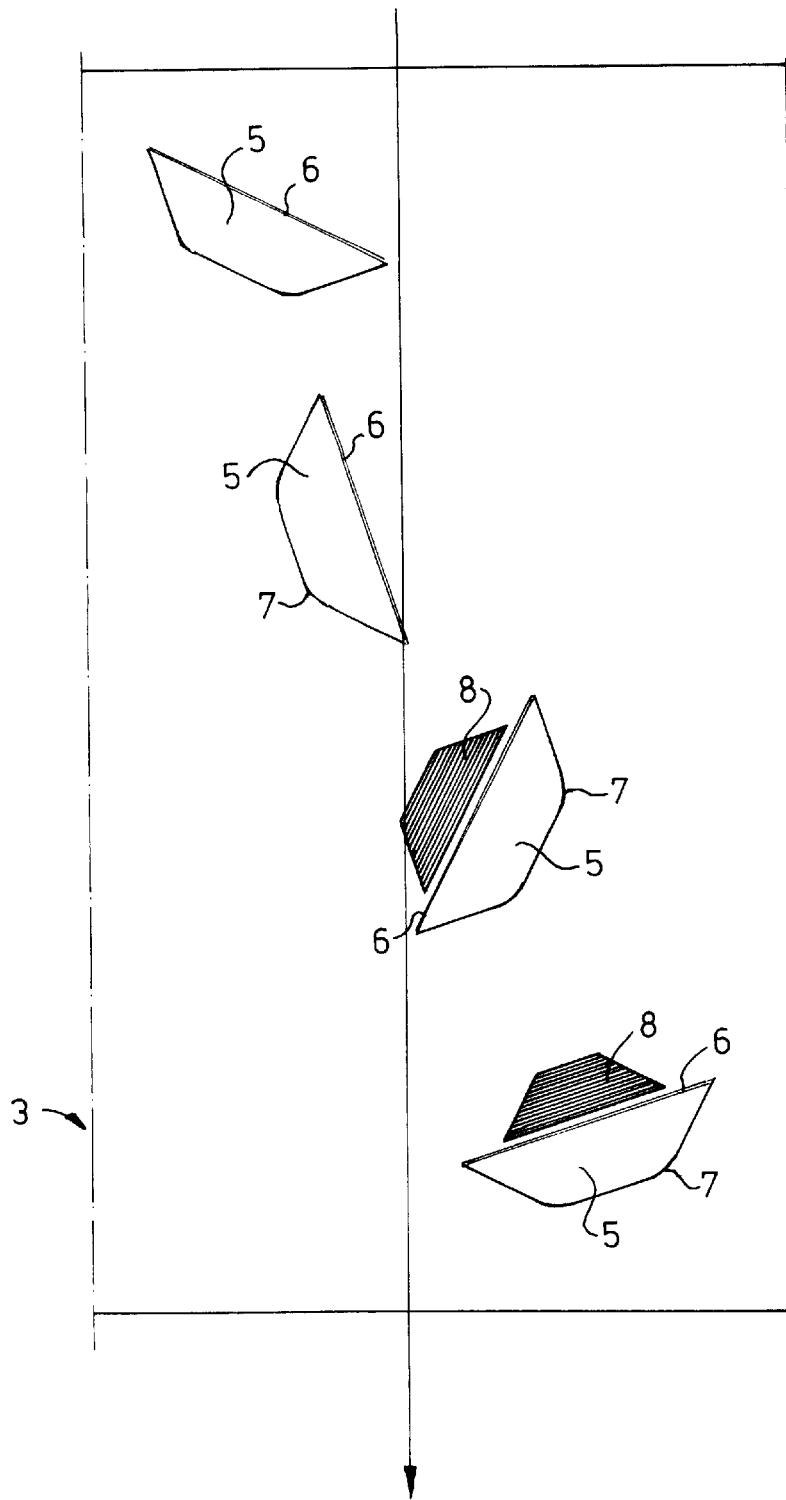
FIG. 4 shows the direction detector with four flaps.

The invention will be explained below with reference to one profile of a vane of a wind turbine. However, it must be understood that the device according to the invention can be used with equal success for any other profile for which the flow characteristics have to be determined. In this context consideration can be given to aircraft, sails, chimneys and the like.

This relates to gas flows. However, the invention is also applicable to fluid flows. In this context, consideration can be given to the study of the flow characteristics over ships' hulls, screws and the like in water.

The wind turbine 1 shown in FIG. 1 consists of an upright 2 with two blades or vanes 3, located opposite one another, mounted thereon. Detail II in FIG. 1 is shown in FIG. 2. Arrow 9 indicates the flow direction, whilst 10 indicates a section with backflow. This backflow is closely linked to the reduction in the load-bearing capacity of the profile with increasing angle of incidence of the flow, which is also termed "stalling" of the profile. In the case of the vanes of some wind turbines the occurrence of such stalling at large angles of incidence is important because it is possible by correct dimensioning of the vane to achieve a situation where above a certain wind force the vane disrupts the flow to such an extent that no further power is taken up by the mill.

That is to say, at low wind force the profile is utilised to the optimum to convert all incident wind as far as possible into useful energy, whilst at high wind force there is a deliberate aim not to use this energy to the full.

That is why it is important to know the flow characteristics over a profile accurately. It is clear that it is also particularly desirable to investigate what the flow characteristics of, for example, the wing profiles of aircraft are, albeit that the considerations are different in that case.

Detail II is shown in FIG. 2 and it can be seen from this that a number of small flaps 5 are also mounted on the suction side of the vane profile.

A single flap is shown in FIG. 3. This flap can be made of any material known in the prior art, such as polycarbonate. The flap width is indicated by b and the height by h. The width can be 8 cm and the height 2 cm. It is also indicated in FIG. 3 that the region 8 of the surface above which the flow characteristics have to be determined optically differs in appearance from the region on the other side of this which is mirrored with respect to the hinge. This can be achieved by the region being retroreflective, fluorescent, etc. Fixing to the top section 11 of the profile can be via a strip or direct (see FIG. 2). In the embodiment shown in FIG. 2, the hinge edge 6 of the flap is the front edge and the free end the back edge. With this arrangement the hinge is made so flexible, for example in the form of a rubber hinge, that even a small component of the flow direction 9 or 10 from the back edge to the front edge is sufficient to cause the flap to turn over.

It can be seen from FIGS. 2 and 3 that the flap is of trapezium-shaped construction. It has been found that if the free corners of the flap are rounded (indicated by 7), the load on the hinge is less and, as a result, in particular the life of the hinge is appreciably extended or the hinge can be of much lighter construction. However, this can be promoted to a much more appreciable extent by making the fixing to the surface for which the flow characteristics have to be determined of rounded construction, which is indicated by 13.

As can be seen from FIG. 2, there is backflow, indicated by arrow 10, at the rear of the profile. As a result flaps 6, 7 and 8 turn (partially) over. As a result the retroreflective surface applied to the profile is exposed. It is, of course, possible to use a colour difference instead of a retroreflective region. Furthermore, it is possible to apply this colour difference not to the profile but to the flap.

It has been found that when retroreflective material is used it is particularly simple to detect when the flaps turn over and/or wheter the flaps have been turned over. If a light source is arranged close to the observer, the latter is also able clearly to detect the turning over of the flaps from a great distance. Turning over can, moreover, be recorded photographically or on video.

It is clear that the thickness of the flap must be relatively small so as not to influence the flow. It is proposed to use a value of less than 0.3 mm.

It is obvious that the functioning of the flaps is no longer guaranteed if the profile is damp or even cools substantially in damp conditions (until it freezes solid). However, it has been found that once such adverse weather conditions no longer prevail the flaps are fully functional again.

FIG. 4 shows a direction detector with four flaps. Depending on the flow direction, the detector can lift in eight different ways. Every 45 degree change in the flow direction will always cause one flap to turn over.

If it is important to fit the device rapidly, the latter can be made in the form of a sticker. In the construction shown in FIG. 2, the adhesive part can be applied as a strip to the vane profile concerned and the non-adhesive flaps 5–7 can extend therefrom. It is also possible to fit each detector individually in the form of a sticker. Of course, here too all corners must as far as possible be rounded in order to prevent detachment.

It has been found that under certain conditions it is possible for water to penetrate beneath the flaps and for the latter to stick as a result. In such a case it can be important either to make the various parts water-repellent or to construct them such that said moisture can be removed in a suitable manner.

With the construction described above it is possible to work with colour differences. In principle, there is no limit to the number of different colours.

If stickers are not used, the flaps can be fixed by any other means known from the prior art, such as by double-sided adhesive tape.

It has been found that, especially when a retroreflective surface and a sufficiently powerful light source are used, it is also possible to investigate rapidly moving profiles. It is true that blurring due to movement results, but if the various situations are recorded photographically it will be found that a light trace is or is not produced, depending on the position of the flap.

Although the invention has been described here with reference to a some preferred embodiments, it must be understood that numerous modifications can be made thereto without going beyond the scope of the present application, as defined in the appended claims. For instance, it is possible to use the device described above for testing all other profiles known in the prior art, such as the streamlined shape of aircraft. The device can also be used for advertising purposes or other applications which are not strictly functional.

What is claimed is:

1. Device for rendering visible the direction of a fluid flow over a surface of an object, comprising a flap-like member which is joined in a hinged manner to said surface and which is located closer to or further away from said surface depending on said flow, wherein the surface of at least one side of said flap and that part of the surface of said object which is located on one side of the hinge line are constructed such that when said part of the surface is optically covered by said flap an optical appearance is obtained differing from the optical appearance in case when said part of the surface is not optically covered, wherein said flap-like member comprises a number of stall flaps, each being arranged to move entirely from one position to another without torsion taking place over the width of the flap.

2. Device according to claim 2, wherein the optical characteristics of the other part of the surface of said object which is on the other side of the hinge line differ from the optical characteristics of the one part of the surface of said object which is on the one side of the hinge line.

3. Device according to claim 2, wherein the difference in optical characteristics is a color difference.

4. Device according to claim 2, wherein the difference in optical characteristics is a difference in reflective characteristics.

5. Device according to claim 2, wherein one of the sides of the flap or that surface of said object which is covered by the flap is a retroreflective surface.

6. Device according to claim 2, wherein the width (b) of the flap is approximately 8 cm.

7. Device according to claim 2, wherein the flap has a trapezium-shaped shape.

8. Device according to claim 7, wherein the free corners of the trapezium which are remote from the hinge line are rounded.

9. Device according to claim 7, wherein the transition between the flap and the surface is made rounded (13).

10. Device according to claim 2, wherein the flap comprises a relatively rigid body section and a relatively flexible hinge section.

11. Device according to claim 7, wherein the hinge section is made of rubber sheet material.

12. Device for rendering visible the direction of a fluid flow over a surface of an object, comprising a flap-like member which is joined in a hinged manner to said surface and which is located closer to or further away from said surface depending on said flow, wherein the surfaces of the sides of said flap which are located opposite one another are constructed such that a different appearance is obtained when observing one side of said flap differing from the optical appearance when observing the other side of said flap, wherein said flap-like member comprises a number of flaps, each being arranged to move entirely from one position to another without torsion taking place over the width of the flap.

13. Device according to claim 12, wherein the difference in optical characteristics is a color difference.

14. Device according to claim 12, wherein the difference in optical characteristics is a difference in reflective characteristics.

15. Device according to claim 12, wherein one of the sides of the flap or that surface of said object which is covered by the flap is a retroreflective surface.

16. Device according to claim 12, wherein the width (b) of the flap is approximately 8 cm.

17. Device according to claim 12, wherein the flap has a trapezium-shaped shape.

18. Device according to claim 12, wherein the free corners of the trapezium which are remote from the hinge line are rounded.

19. Device according to claim 18, wherein the transition between the flap and the surface is made rounded.

20. Device according to claim 18, wherein the flap comprises a relatively rigid body section and a relatively flexible hinge section.

21. Device according to claim 12, wherein the hinge section is made of rubber sheet material.

22. Device for rendering visible the direction of a fluid flow over a surface of an object according to claim 18, comprising a flap-like member which is joined in a hinged manner to said surface and which is located closer to or further away from said surface depending on said flow, wherein the surfaces of the sides of said flap which are located opposite one another are constructed such that a different appearance is obtained when observing one side of said flap differing from the optical appearance when observing the other side of said flap, wherein said flap-like member comprises a number of flaps, each being arranged to move entirely from one position to another without torsion taking place over the width of the flap.

\* \* \* \* \*